May 12, 1964

J. E. HINCKLE 3,132,607

CANDY SUCKER FORMING, WRAPPING AND SEALING
MACHINE AND METHOD

Filed July 19, 1961

INVENTOR
JOHN E. HINCKLE

BY Cushman, Darby & Cushman

ATTORNEYS

May 12, 1964

J. E. HINCKLE 3,132,607

CANDY SUCKER FORMING, WRAPPING AND SEALING
MACHINE AND METHOD

Filed July 19, 1961

INVENTOR
JOHN E. HINCKLE

BY Cushman, Darby & Cushman
ATTORNEYS

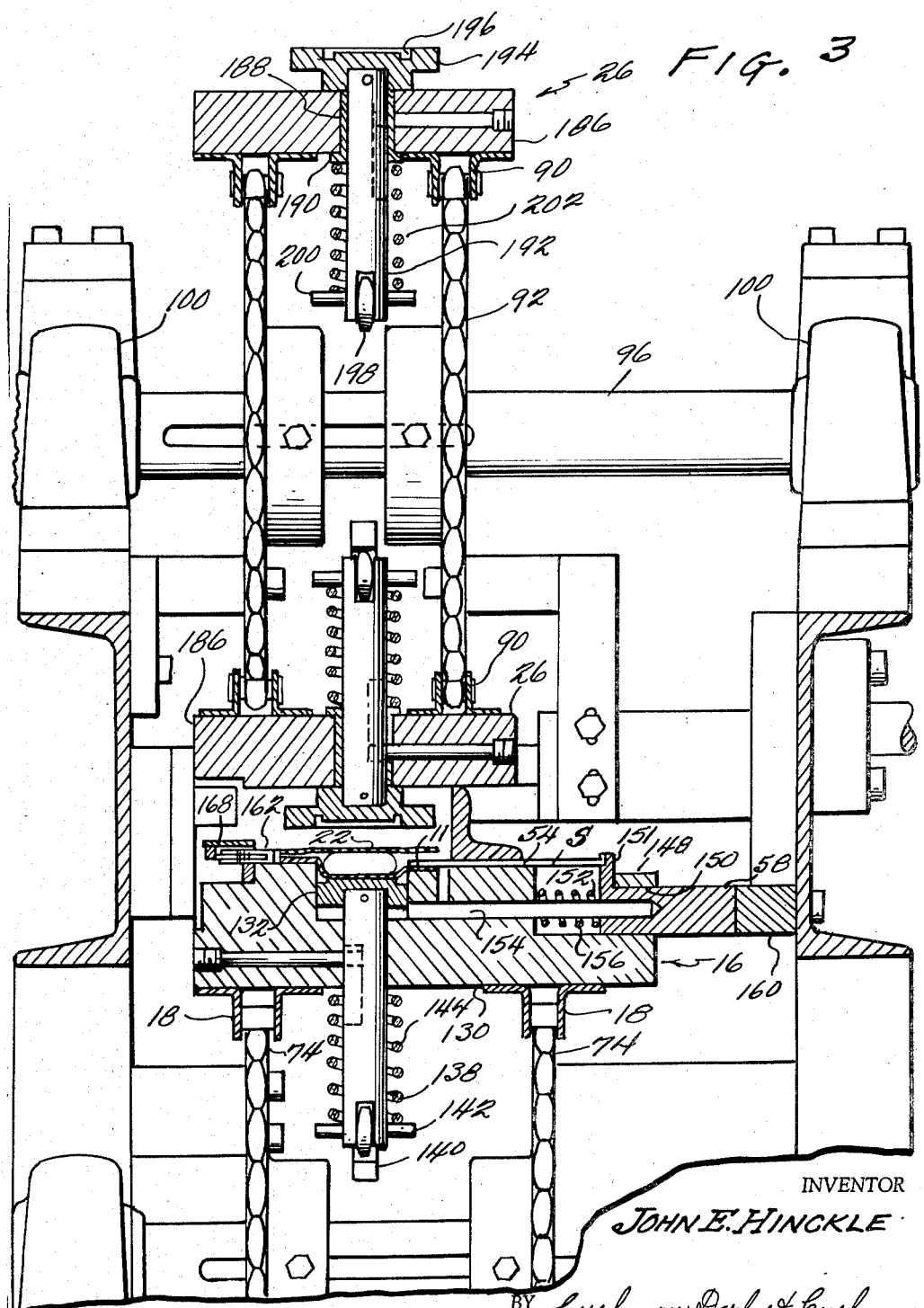

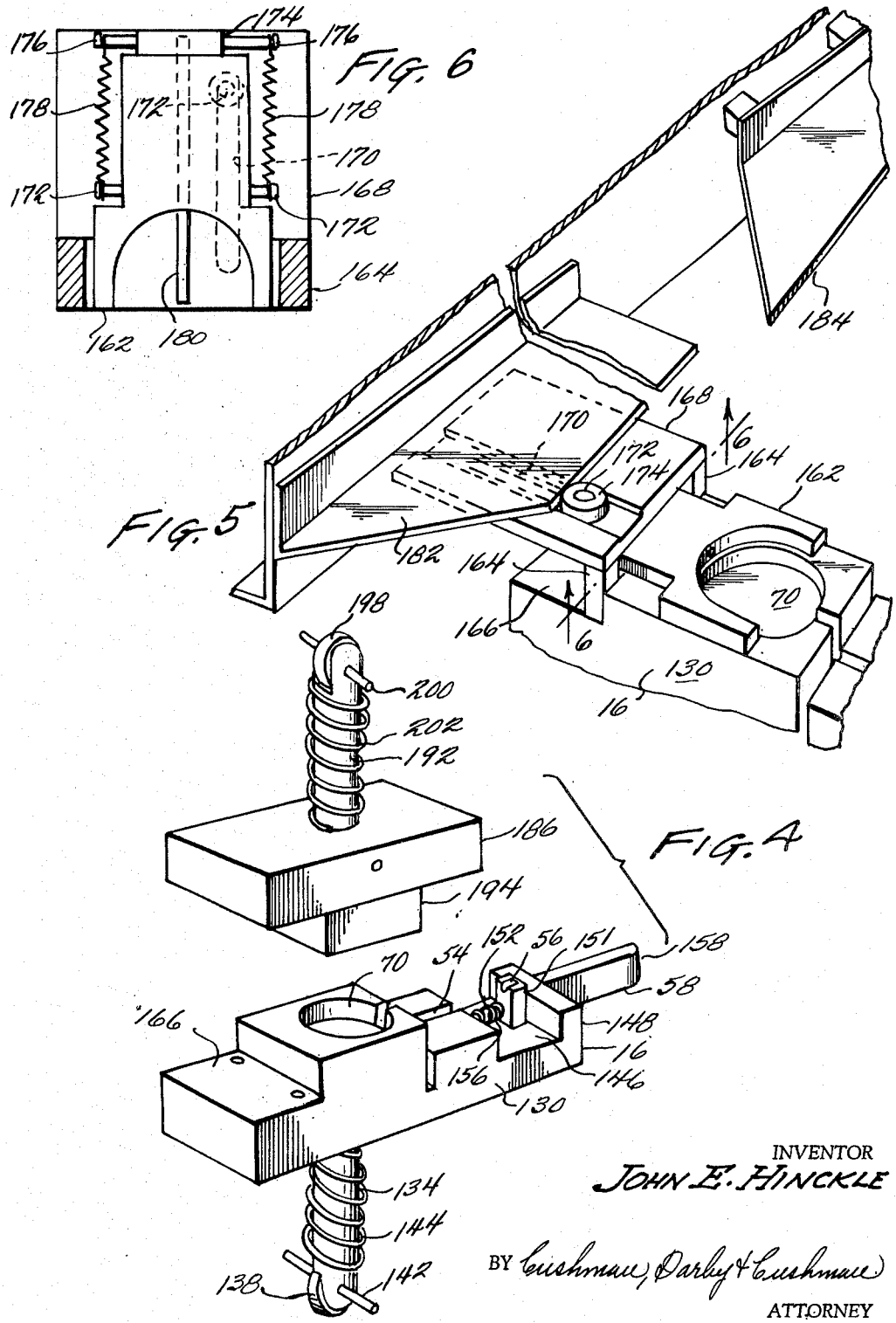

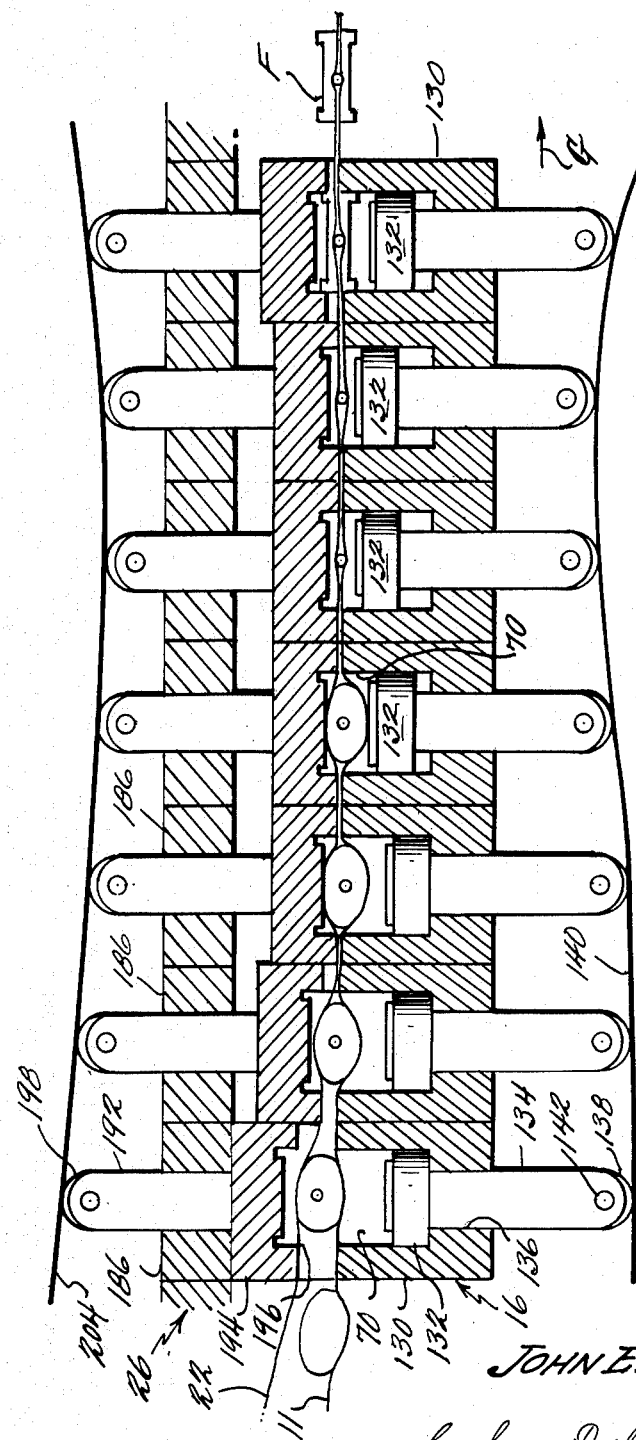

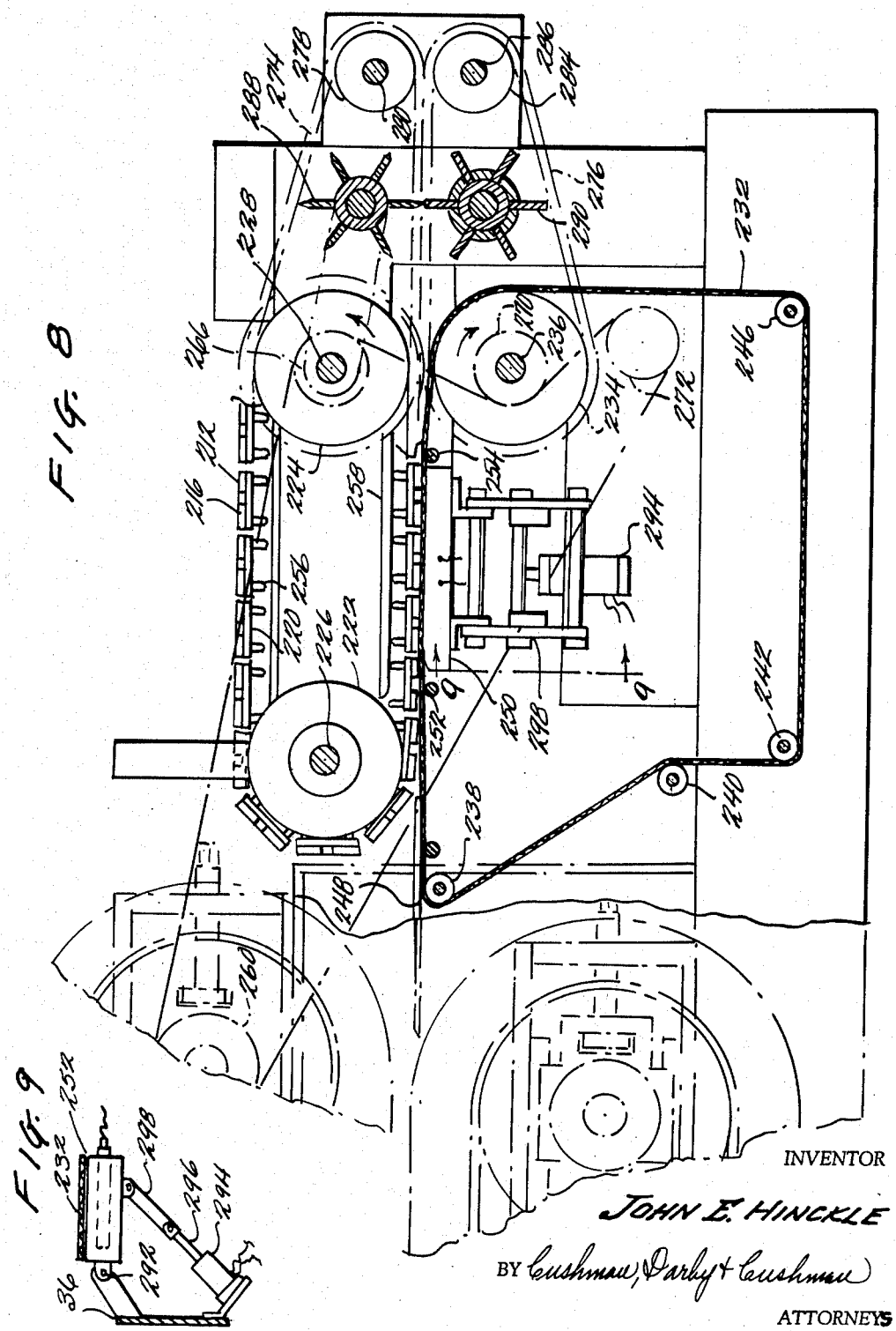

INVENTOR
JOHN E. HINCKLE
BY Cushman, Darby & Cushman
ATTORNEYS

United States Patent Office 3,132,607
Patented May 12, 1964

3,132,607
CANDY SUCKER FORMING, WRAPPING AND SEALING MACHINE AND METHOD
John E. Hinckle, Richmond, Va., assignor to Apex Machine Manufacturing Company, Incorporated, Richmond, Va., a corporation of Virginia
Filed July 19, 1961, Ser. No. 125,255
22 Claims. (Cl. 107—4)

The present invention relates to a method and apparatus for forming candy pieces into suckers while sandwiched between sheets of wrapping material for the same and then sealing the sheets of wrapping material together about the formed candy suckers. The suckers or lollipops referred to hereinafter in the specification are of the type wherein an unformed piece of candy is formed to a desired shape and impaled upon a stick which provides a handle for the same.

Heretofore candy suckers have been made from the candy product when the candy product is in a warm and plastic condition. The candy product was rolled or suitably formed while in the warm and plastic condition into a rope shape and then was fed in step-by-step motion to suitable cutters which cut the candy rope into small pieces and deposited the pieces directly into forming dies, which were usually on the peripheral portion of a rotary disc, where the shape of the sucker was formed and a stick was impaled therein. After the sucker had been formed, the sucker was then fed to a wrapping machine which utilized rolls of heat sealable wrapping material to encase the sucker and seal the material about the same. Complicated mechanism for transferring the sucker to and through the wrapping machine was required in order that the formed sucker with the stick therein could be positioned between the sheets of wrapping material. Such prior mechanism involved conveying means for first grasping sucker handles and then conveying the sucker through the wrapping machine. Difficulties were encountered in designing the conveying mechanism for accurately grasping the sucker handles to maintain the suckers in proper oriented position as they passed through the wrapping machine and consequently the speed of operation of the entire process of manufacturing and wrapping the sucker was limited.

An object of the present invention is to provide a method of and apparatus for forming and wrapping candy suckers simultaneously whereby an increased speed of operation is obtained with a minimum of difficulty. For example, the prior art processes and apparatus have been limited in their production of suckers to approximately 250 suckers per minute whereas the method of and apparatus for making suckers by the present invention easily starts operation at approximately 250 suckers per minute and has been operated at speeds up to and above 500 suckers per minute.

Another object of the present invention is to provide a method of and apparatus for making and wrapping suckers wherein the unformed candy pieces are sandwiched between sheets of the wrapping material so that the sucker forming and wrapping operation is simultaneous and the subsequent sealing of the wrapping material accomplished without any special means for supporting the suckers as the wrappers are being sealed.

A further object of the present invention is to provide a method and apparatus for making suckers whereby the wrapping material is utilized to convey the unformed pieces of candy while the sucker is being formed and simultaneously wrapped and while the wrapping material is being sealed.

Still another object of the present invention is to provide a method of and apparatus for continuously producing wrapped, sealed suckers wherein the simultaneous forming and wrapping operation and the subsequent sealing operation is accomplished in a straight or in-line operation thereby eliminating handling problems caused by centrifugal forces developed in the rotary type die forming machines.

Ancillary to the preceding object, it is a further object of the present invention to provide an apparatus for the straight or in-line forming, wrapping and sealing of suckers which will have less floor space in a plant and accommodate itself to the subsequent packaging of specified numbers of wrapped suckers.

Another object of the present invention is to provide a heat sealing unit for sealing wrappers of previously wrapped suckers which has means cooperating with the operation of the forming and wrapping units whereby when such units stop, the wrapping material within the heat sealing unit is not damaged.

A still further object is to provide an improved type of heat sealing unit for sealing wrappers on candy suckers which will not damage the formed sucker regardless of whether the candy is still in a soft plastic condition or has hardened.

These and other objects and advantages of the present invention will appear more fully in the following specification, claims and drawings in which:

FIGURE 3 is an enlarged sectional view taken substantially on the line 3—3 of FIGURE 2;

FIGURE 4 is a perspective view of the upper and lower cooperating forming dies for forming and simultaneously wrapping the sucker;

FIGURE 5 is a fragmentary perspective view illustrating fingers cooperating with the lower forming dies for positioning the unformed piece of candy prior to its being formed into sucker shape;

FIGURE 6 is a view looking up and taken substantially on the line 6—6 of FIGURE 5;

FIGURE 7 is an enlarged schematic view illustrating the method of the present invention of simultaneously forming and wrapping a sucker;

FIGURE 8 is an enlarged fragmentary side elevational view partially in section and partially in broken lines illustrating the heat sealing portion of the apparatus of FIGURE 1;

FIGURE 9 is a sectional view taken substantially on the line 9—9 of FIGURE 8.

Figure 1:
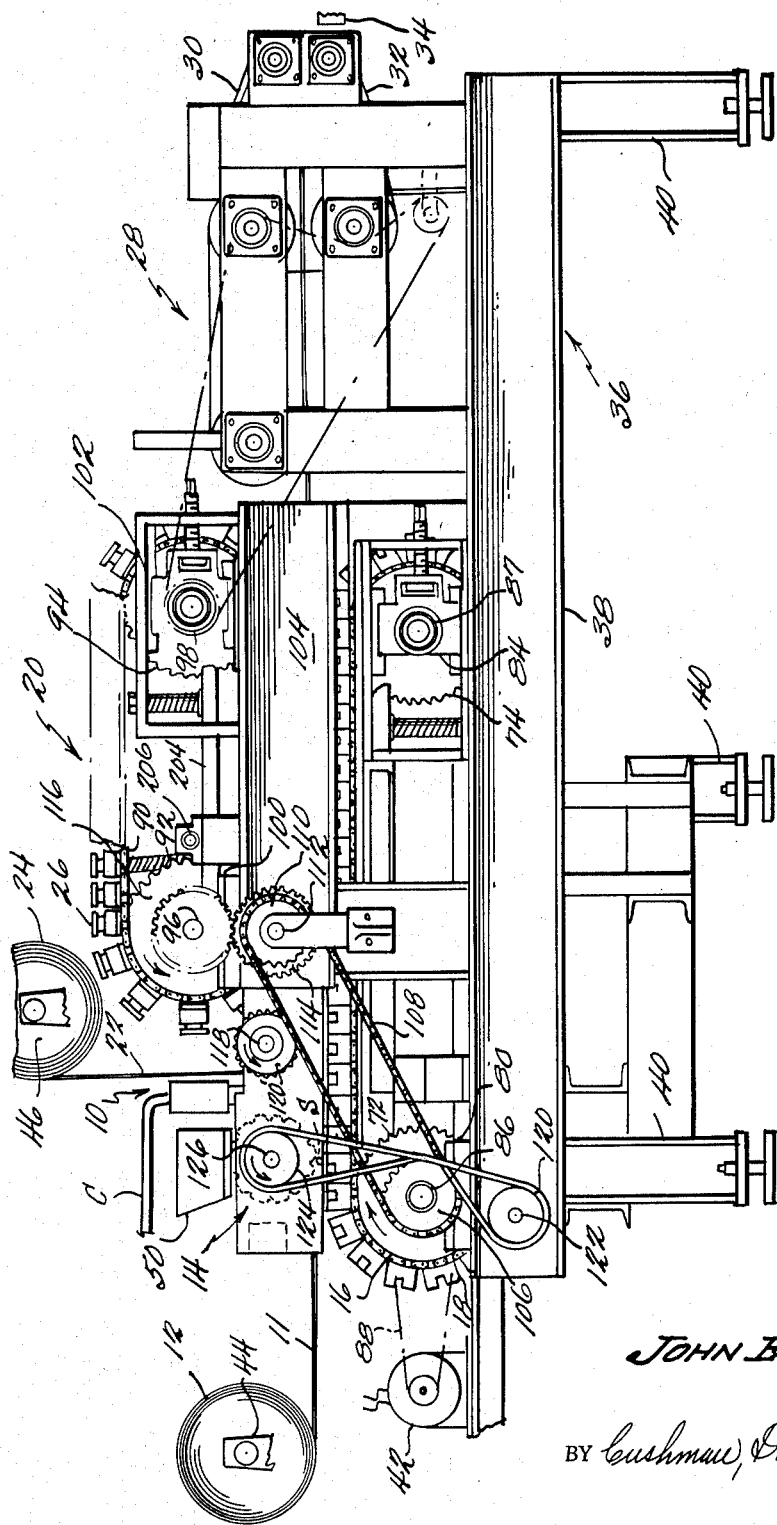
FIGURE 1 is a side elevational view of an apparatus embodying the present invention, portions of the apparatus being shown schematically or in broken lines for purposes of clarity.

Referring now to the drawings wherein like character or reference numerals represent like or similar parts, the novel and improved apparatus of the present invention is best illustrated in its entirety in FIGURE 1. In order to better understand the apparatus and its operation in accomplishing the foregoing objects of the invention, a brief description of the process involved in the present invention will be given first.

A batch of candy product which is to be made into the suckers or lollipops is taken while in a warm and plastic condition and rolled or otherwise formed into a rope C which is fed into a suitable cut-off device generally indicated at 10. Pieces of unformed candy while still soft and plastic are cut from the candy rope C and deposited by gravity onto a moving sheet or tape 11 of wrapping material fed from a roll 12 of the same. Just prior to the unformed candy pieces being deposited onto sheet 11, which is moving in a horizontal plane therebeneath, sucker sticks S are successively deposited by a stick wheel generally indicated at 14, the sticks S being received and suitably supported on bottom die blocks 16 of a lower enless belt-like mechanism 18 which forms part of a molding and wrapping means generally designated 20. The sticks S are so supported by the die blocks 16 that one of their end portions overlies a portion of the sheet 11 and when the unformed candy pieces are deposited on the moving sheet 11, they are deposited adjacent the end portions of the previously positioned sticks S.

A second sheet or tape 22 of wrapping material is fed from the roll 24 to a position where it overlies and moves with the first sheet 11 so that the unformed candy pieces and the end portion of the sticks S are sandwiched between the upper and lower sheets 22 and 11 respectively. It will be understood that the movement of the sheets 11 and 22, the depositing of the sticks S and candy pieces is so timed that there is a predetermined space between successively fed pieces of candy and their associated sticks.

The sheets of wrapping material of rolls 12 and 24 may be cellophane, polyethylene, or any flexible material which is heat sealable and generally impervious to air and water as well as being non-toxic.

The sandwich construction formed by the sheets 11 and 12 with the unformed candy pieces and the end portion of the sticks S therebetween is then fed to the sucker molding and wrapping means 20 wherein the lower die blocks 16 cooperate with upper die blocks 26 to form the unformed candy pieces to a desired shape while intermediate the juxta-positioned sheets 22 and 11. Since the candy pieces are soft and pliable, the cooperating die blocks 16 and 26 mold the unformed candy pieces into the desired sucker shape while also causing the flexible sheets of material 11 and 22 to assume substantially the same configuration as the configuration of the finished sucker without the danger of the candy puncturing the thin flexible sheet material.

While the candy pieces are being formed into sucker shapes in the molding and wrapping means 20, the sticks S which have been previously deposited in die blocks 16 in a position adjacent the unformed candy pieces are moved transversely of the sheets 11 and 22 toward the candy pieces so that they impale the candy pieces during their formation into suckers.

After the suckers have been formed and the sticks S impaled therein, and the sheets 11 and 22 wrapped about the suckers, the string of wrapped suckers then pass into a heat sealing means generally designated at 28. Pressure and heat are applied to at least the portion of the sheets 11 and 22 which are contacting each other thus causing the confronting surfaces of the sheets to fuse together and form a tight seal encasing the suckers about their periphery and about the portion of the sticks S immediately adjacent the suckers.

The suckers then pass from the sealing means 28 and their handles are gripped between a pair of timing belts 30 and 32, the timing belts carrying the string of suckers through cut-off knives which cut the suckers into individually wrapped suckers. Any suitable conveyor or chute means 34 may be provided for carrying away the individually wrapped suckers to suitable counting and packaging apparatus.

It will now be obvious that the method hereinabove described involves a straight-line or in-line operation for forming and producing a string of suckers wrapped and sealed in the wrapping, the conveyance of the wrapping material and the unformed pieces to the molding and wrapping means 20 and sealing means 28 being accomplished by the fact that the sheets previously sealed together and wrapped about formed suckers pull the same through the apparatus by action of the molding and wrapping means 20 as well as the heat sealing means 28. In other words, control of the candy is maintained through the molding and simultaneous wrapping operation as well as in the heat sealing operation by the initial arrangement of the candy pieces and stick between the strips so that there is no necessity of special equipment for picking up and handling individually the units as they pass from one operation to another.

*Molding and Wrapping Unit of Apparatus*

Figure 2:
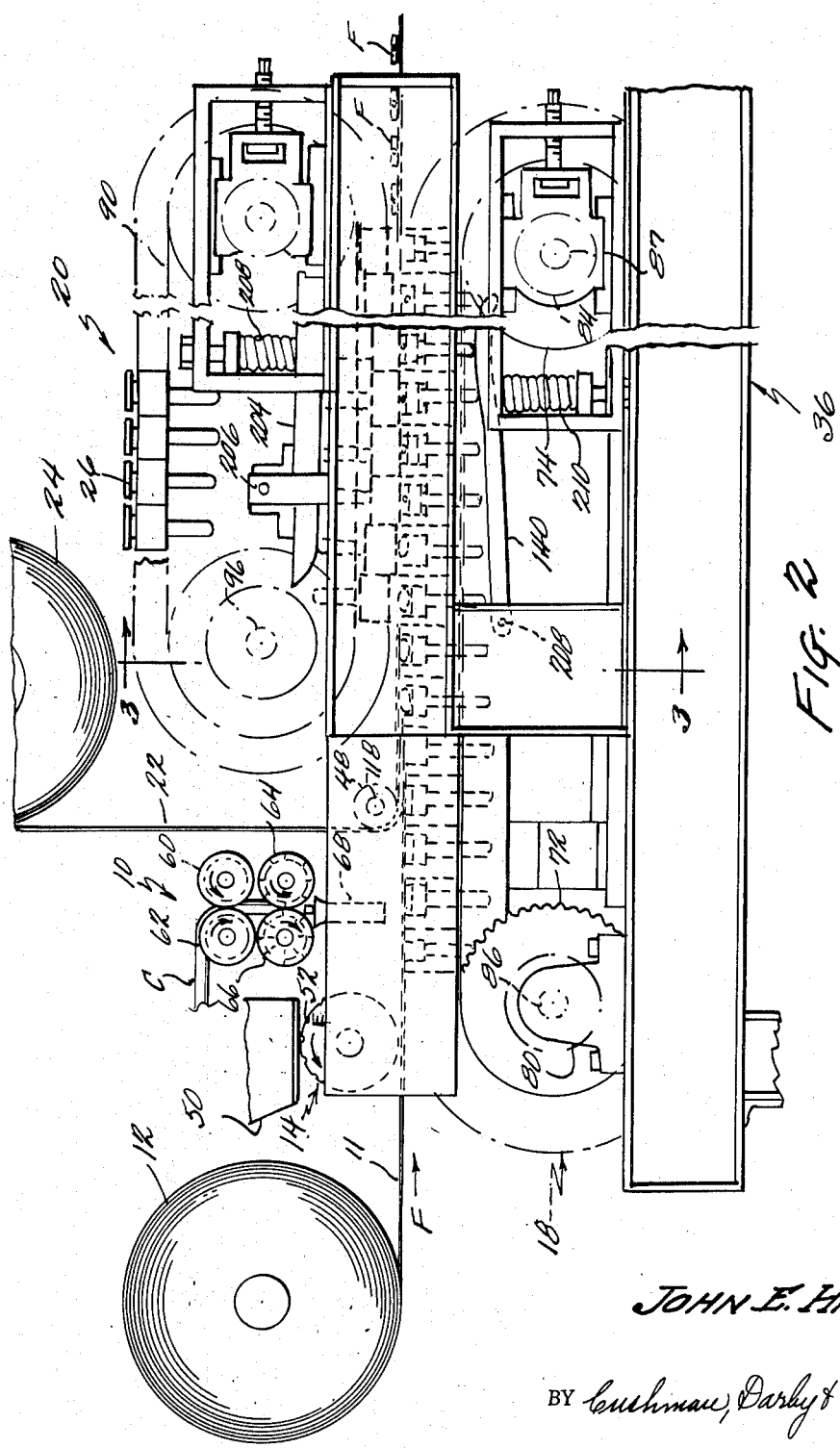
FIGURE 2 is an enlarged fragmentary side elevational view of a portion of the apparatus shown in FIGURE 1 and illustrating the principles of the method involved wherein the candy pieces are sandwiched between the sheets of wrapping material fed from suitable rolls and are simultaneously formed into suckers and wrapped.

Referring now, in particular, to FIGURES 1 and 2, the apparatus of the present invention is provided with a frame structure generally designated at 36 which includes at least a pair of longitudinal support members 38 carried on suitable standards 40. The longitudinal support members 38 may be of the usual I-beam or channel construction and cross members (not shown) are provided between the members 38 making a rigid base for the molding and wrapping means 20 and the sealing means 28 as well as the drive for the same.

Carried on the frame structure 36 is a suitable source of power 42 such as an electric motor or the like. The electric motor 42 is adapted to drive the various elements of the apparatus in timed sequence, as will be hereinafter described in more detail.

Brackets 44 and 46, suitably mounted on the frame structure 36, rotatably support the rolls 12 and 24 of heat sealable wrapping material such as cellophane, substantially parallel axes extending transverse of the longitudinal axis of the apparatus. As best shown in FIGURE 1, the sheet or tape 11 is fed horizontally from the roll 12 into the apparatus from a position forward of the stick wheel 14 across the top run of the die blocks 16 of the lower endless belt-like mechanism 18. The strip 11, which is a continuous strip fed off roll 12, extends all the way through the apparatus and becomes one side of the wrapper of the sucker as it is being formed. On the other hand, the sheet or tape 22 is likewise a continuous strip fed off the roll 24 around a pulley 48 (FIGURE 2), this sheet then being fed horizontally through the apparatus in substantially contiguous relationship with the sheet 11 but with the unformed pieces of candy sandwiched therebetween. The feed of the sheets 11 and 22 through the apparatus is by the coaction of the molding and wrapping means 20 as well as the sealing means 28, as will be explained in more detail later in the specification.

Stick wheel 14 is positioned beneath a stick hopper 50 and sticks are fed one by one from the hopper into suitable grooves 52 provided on the periphery of the wheel 14. Rotation of the wheel in the direction of the arrow E causes the sticks to be transferred from the hopper and deposited by gravity in spaced relationship to each other onto the lower strip 11 as the strip moves beneath the stick wheel 14 in the direction of the arrow F. The end portion of the stick S which is to be impaled into the unformed candy piece lies on the sheet 11, whereas the handle portion of the stick is deposited in a groove 54 provided in the lower die block 16, as best shown in FIGURES 3 and 4. The outermost end of the handle portion of the stick lies in a groove 56 in a pusher mechanism 58.

The cut-off device 10 for the rope candy C is interposed between the stick wheel 14 and the position where the upper sheet 22 is fed down over the lower die blocks of the endless belt-like mechanism 18. The cut-off device 10 includes a pair of continuously rotating feed rollers 60 and 62 which are driven by a variable speed drive off the motor 42. The rollers 60 and 62 have concave outer peripheral surfaces provided with small circumferentially spaced projections for gripping and positively feeding the candy to a second pair of cooperating cutting rollers 64 and 66 positioned immediately therebeneath. The speed of the rollers 60 and 62 may be varied so as to accurately control the amount of candy fed to the cutting rollers 64 and 66 to thereby change the quantity of the unformed candy if such is desired.

Rollers 64 and 66, which are continuously rotated in opposite directions, are each provided with an outer peripheral surface which is also concave. The rollers 64 and 66 are provided with radially extending transverse knife blades across the concave surfaces which coact with each other to cut off the desired length of candy from the rope candy C and deposit the same through a chute 68 onto the lower sheet 11 of wrapping material. It will suffice to say at this time the unformed piece of candy cut from the rope of candy C is deposited in a position on the sheet 11 of wrapping material so that it is centered about a cavity 70 provided in the die block 16 which is so turned as to be under the outlet of the discharge chute 68. This will position the unformed piece of candy adjacent the end of the previously deposited stick S and during the subsequent operation of the forming and simultaneous wrapping of the sucker, the stick is impaled into the sucker.

Referring now additionally to FIGURES 3 through 7, inclusive, the die blocks 16 are each individually mounted on the endless belt-like mechanism 18, which in this particular case is an endless link chain, the endless belt-like mechanism 18 passing about sprockets 72 and 74 suitably mounted on shafts 86 and 87 carried in bearing pillow blocks 80 and 84. The bearing pillow block 84 is made adjustable toward and away from the bearing pillow block 80 so that the tension on the mechanism 18 can be varied. Sprocket 74 is an idler sprocket keyed to shaft 87 whereas 72 is keyed to a drive shaft 86 which also has keyed thereto a sprocket pulley coupled by an endless chain belt 88 to the motor 42.

The upper die blocks 26 are similarly carried on an endless belt-like mechanism 90 which passes about a pair of horizontally spaced sprockets 92 and 94. The sprockets 92 and 94 are suitably mounted on shafts 96 and 98 which are respectively supported in pillow blocks 100 and 102 carried on a suitable frame member 104 (FIGURES 1 and 3). The pillow block 102 is adjustable toward and away from the pillow block 100 so as to adjust the tension of the endless belt-like mechanism 90.

As best shown in FIGURE 1, the drive shaft 86 is provided with a sprocket gear 106 about which passes an endless chain 108. The endless chain 108 also passes about a sprocket gear 110 carried on a shaft 112 which is provided with a gear 114 that meshes with a gear 116 carried on the shaft 96. After passing about the sprocket gear 114, the endless chain 108 passes about an idler sprocket gear 120 rotatably mounted on a shaft 122 carried by the frame structure 36. The endless chain then passes over a sprocket gear 124 carried on a shaft 126 on which is mounted the stick wheel 14. After passing about the sprocket gear 124, the chain 108 passes around the sprocket gear 106 to complete its endless path. As is now evident, the endless belt-like mechanisms 18 and 90 are driven in timed relationship to one another so that the lower run of the upper belt-like mechanism 90 travels in the same direction and at the same speed as the upper run of the lower belt-like mechanism 18. Also, the stick wheel is rotated in timed relationship with the endless belt-like mechanisms 18 and 90 so that it deposits sticks successively in the grooves of die blocks 16 as they pass therebeneath.

Endless chain 108 is also used to positively drive the roller 48 about which passes the upper sheet of wrapping material 22 as it is fed off of roll 24. This is accomplished by mounting the roller 48 on a shaft 118 which also has keyed thereto a sprocket gear 120' that meshes with and is driven by the chain 108 as shown in FIGURE 1.

As shown in FIGURES 3 through 7 inclusive, the die blocks 16 and 26 cooperate to both form the sucker from the unformed piece of candy as well as cause the upper and lower sheets 22 and 11 of wrapping material to be shaped about and wrap the sucker. This operation of forming and wrapping is accomplished substantially simultaneously so that all that is necessary after the sucker is formed and wrapped is to heat seal the two sheets of wrapping material together by the heat sealing unit 28.

The plurality of die blocks 16 carried on the lower endless belt-like mechanism 18 are similarly constructed and each operate in an identical manner, and therefore, the description of one die block 16 will suffice for all die blocks 16. The bottom die block 16 comprises a base member 130 which is provided with the cavity 70 of desired shape of the lollipop to be formed. Mounted in the cavity 70 is a die insert or piston 132 carried on the end of a piston rod 134 extending through a bore 136 in the base member 130. A cam follower or roller 138 is provided on the lower end of the piston rod 134 for engaging a cam 140 carried by the frame 36. Interposed between a pin 142 which carries the roller 138 and the lower surface of the base member 130 is a coil spring 144 which normally urges the piston rod 134 and its die insert 132 to the bottom of the cavity 70.

The base member 130 is provided with an undercut recess 146 which provides an upstanding outer flange 148. The flange 148 has a bore 150 therein in which is mounted the pusher member mechanism 58. The pusher mechanism 58 is provided with an offset portion 151 at its end which lies within the recess 146, the offset portion being provided with the groove 56 for receiving the end of the stick S. A guide pin 152 fixedly carried in the end of the pusher mechanism 58 rides in a bore 154 provided in the base member 130. Compression spring 156 interposed between the offset portion 151 and the wall of the recess 146 in base member 130 normally urges the pusher mechanism 58 in a position outwardly of the die block so that the offset portion 151 engages the outer wall of the recess 146. The outer 158 of pusher mechanism 58 is rounded and provides a cam follower surface for engaging a stick impaling cam 160 suitably carried on the frame structure. As will now be evident, the cam 160, which is positioned adjacent the upper run of the die blocks 16, engages the end 158 of the pusher mechanism 58 to move the same against the spring 156, the offset portion 151 pushing the end of the stick so that the stick slides in the groove 54 between the lower and upper sheets 11 and 22 into the piece of candy as the same is being formed into a sucker.

Each lower die block 16 is provided with an open bifurcated finger 162 (FIGURES 5 and 6) which is adapted to be moved over the cavity 70 in the die block for maintaining the position of the unformed candy in place on the sheet 11 after it is received from the cut-off rollers 64 and 66. In more detail, the base member 130 is provided with a U-shaped element 164 that is fixedly supported in a recess 166. The U-shaped element 164 has its legs extending outwardly of the top surface of base member 130 and a plate member 168 is attached thereto. The plate member 168 has an elongated slot 170 through which passes a shaft 172 fixedly carried on the outer end of the finger 162. The upper surface of the plate member 168 is provided with a groove in which a cam follower roller 174 carried on the end of the shaft 172 rides. Finger 162 is provided with a pair of oppositely disposed pins 172 (FIGURE 6) and the plate member 168 is provided with a downwardly depending block 174 also having a pair of oppositely disposed pins 176. Springs 178 connected between the pins 172 and 176 normally urge the finger in a direction towards the left of FIGURE 5 so that the finger is withdrawn from its illustrated position. A pin 180 fixedly connected to the block 174 extends through a bore provided in the finger 162 and constitutes a guide pin upon which the finger moves. As shown in FIGURE 6, when the finger is retracted, the pin extends into the area between the bifurcated ends of the finger whereas when the finger is extended to partially encompass the cavity 70, as shown in FIGURE 5, the finger rides on the pin to a position where the pin does not extend into the opening between the bifurcated ends of the finger.

A cam 182 fixedly secured to the frame structure in the path of the cam follower 174 is adapted to engage the cam follower and extend the finger 162 to the position shown in FIGURE 5 just prior to the die block 16 passing under the outlet of chute 68. The finger 162 remains in this extended position until just prior to the die block 16 coming in contact with a complementary upper die block 26. At this point, the cam 182 is terminated and the springs 178 return the finger 162 to its retracted position so that the upper die block 26 can contact the lower die block with the sheets 11 and 22 of wrapping material and unformed candy piece sandwiched therebetween. To insure withdrawal of the finger 162 to the retracted position shown in FIGURE 6, a second cam 184 fixedly carried on the frame structure 36 is provided in the path of the cam follower 174 to engage the same and cause the finger to withdraw if it has not already been withdrawn by means of the spring. It will be understood that the finger 162, when extended to the position shown in FIGURE 5 for properly maintaining the unformed candy in place on the bottom dies and on the sheet 11, has sufficient clearance with the top surface of the base member 130 so that the sheet 11 can pass between it and the base member.

The upper die blocks 26 which are connected to the endless belt-like mechanism 90 are best illustrated in FIGURES 2, 3, 4 and 7. As shown in FIGURE 2, it will be noted that the endless belt-like mechanism 90 is of shorter length than the endless belt-like mechanism 18 in order that there can be proper feeding and positioning of unformed candy pieces on the lower sheet as well as sandwiching of the sheets 11 and 22 with the pieces of unformed candy therebetween and the sticks S in position. However, the lineal speed of the lower run of upper die blocks 26 is identical to the lineal speed of the lower die blocks 16 as the cooperation of the die blocks forms and wraps the suckers.

Upper die block 26 includes a base member 186 which is attached to the endless belt-like mechanism 90 in any suitable manner. The base member 186 is provided with a bore 188 therethrough in which is mounted a sleeve bushing 190. Extending through the sleeve bushing 190 is a piston rod 192 having a piston-like die 194 carried on its outer end, the die 184 being provided with a cavity 196 having the desired shape for the sucker or lollipop. Carried at the other end of piston rod 192 is a roller or cam follower 198 mounted on a pin 200. Interposed between the pin 200 and the base member 186 is a spring 202 which normally urges the die 194 into contact with the base member 186, as illustrated in FIGURE 3.

Cam follower 198 is adapted to engage a cam 204 which will cause the piston to move the die 194 toward and into contact with the lower die block 16, it being understood that the wrapping material and the unformed candy is sandwiched between the die 194 and the lower die block 16. The cam 204 is pivotally supported on the frame structure, as indicated at 206 in FIGURE 2, there being a spring 208 supported in the frame structure 36 and bearing against the top surface of the cam to hold it in its normal operative position. Should an improperly positioned stick S or any foreign material enter the confronting surfaces of the dies, such as an unformed piece of candy not being properly positioned, the cam 204 can pivot about its pivot 206 so that the dies 194 will not be damaged.

Cam 140 for the lower die blocks 16 and their die inserts likewise is pivotally mounted to the frame structure, as indicated at 208. If for any reason the die inserts 132 engage an obstruction in their movement, the cam 140 can pivot about the pivot 208 against a spring 210 carried in frame structure 36 so as to protect the die insert from damage.

As shown schematically in FIGURE 7, sheets 11 and 22 with unformed candy pieces sandwiched therebetween are conveyed between the lower run of upper die blocks 26 and upper run of lower die blocks 16. Just previous to this action, the fingers 162 discussed above are withdrawn from their extended positions so they will not interfere with the sucker forming and wrapping operation. The cam follower 198 engages the cam surface 204 to first lower the die 194 toward the lower die blocks until the top sheet of wrapping material and the top die 194 contact the bottom sheet 11 of wrapping material and the upper face of base member 130 of the bottom die block 16. Then the cam follower 138 of the piston rod 134 engages the cam 140 and urges the die insert 132 upwardly in the cavity 70 to the correct position for molding the unformed piece of candy into correct shape while the sheets of wrapping material on either side of the candy are also pressed into proper shape about the formed sucker. Simultaneous with this action, the presser mechanism 58 engages the cam 160 and the stick S is moved transversely between the sheets 11 and 22 into the sucker as it is being formed. The respective dies are then withdrawn from the formed wrapped sucker and it is further conveyed through the heat sealing means 28 where the confronting edge portions of the sheets 11 and 22 around each of the formed suckers are caused to be heat sealed together. It will be understood that the operation just described for a single sucker is carried out successively to form a string of wrapped suckers between the strips or tapes of heat sealing wrapping material and thereby provides a means of properly maintaining the suckers and their sticks in an oriented position for reception in the heat sealing means 28. The operation illustrated in FIGURE 7 is progressive from the left hand side of the figure toward the right hand side of the figure, with the formed wrapped sucker being identified at F and moving in the direction of the arrow G.

Heat Sealing Unit of Apparatus

Figure 10:
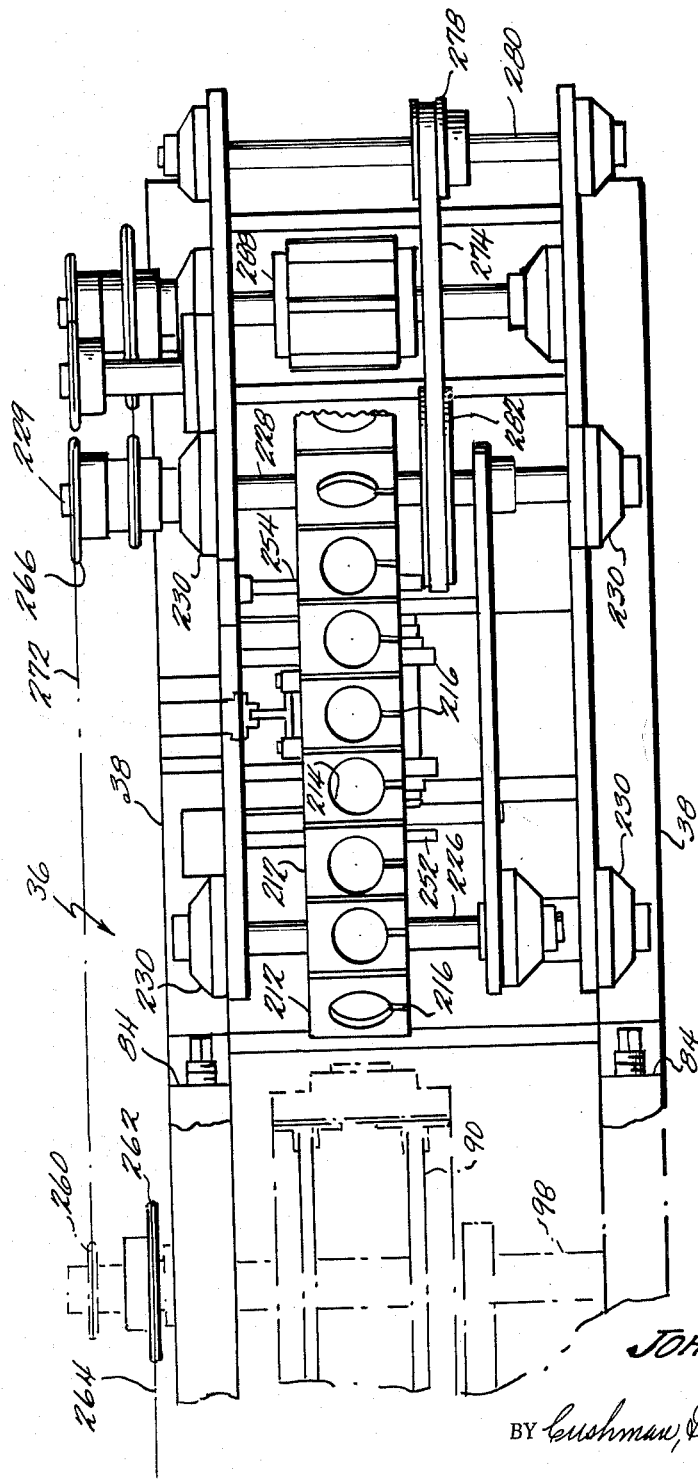
FIGURE 10 is a top plan view of the fragmentary portion of the apparatus shown in FIGURE 8.

Heat sealing means 28 for continuously sealing the string of formed wrapped suckers or lollipops is best illustrated in FIGURES 8, 9 and 10, its relationship to the other units of the apparatus being best illustrated in FIGURE 1.

The heat sealing means includes an overhead endless conveyor belt 220 having a plurality of soft rubber or rubber-like pads 212 each individually carried thereon. Each of the rubber-like pads 212 is provided with an enlarged cavity 214 generally of the shape of the formed sucker, it being desirable that there be some clearance between the walls of the cavity and the formed sucker. Also, each pad is provided with a recess 216 communicating with the cavity 214 for receiving the portion of the sucker stick S immediately adjacent the formed sucker impaled thereon. The endless conveyor 220 passes about sprockets 222 and 224 keyed respectively to shafts 226 and 228. The shafts are suitably journalled in the bearings 230 carried by the frame structure 36.

Cooperating with the lower run of pads 212 is an endless belt 232 made of "Teflon" impregnated glass cloth. "Teflon" is a tetrafluoroethylene resin. The belt 232 passes over a drive roller 234 carried on a shaft 236 also suitably journalled in the frame structure 36. The belt 232 also passes around idler rollers 238, 240, 242 and 246. As illustrated in FIGURE 8, the forward end of the upper substantially horizontal run of the belt 232 which passes around the idler pulley 238 is immediately adjacent the outfeed of the forming and sealing means 20, there being fingers 248 caried by the frame structure 36 for supporting the string of formed wrapped suckers as they are discharged therefrom onto the belt.

Immediately beneath the belt 232 in an area adjacent to the lower run of pads 212 is an electric heater element 250. Both fore and aft of the heater element 250 are a pair of rods 252 and 254 carried by the frame structure 36, the rods extending transversely beneath the substantially horizontal run of the belt 232. The rods 252 and 254 maintain the belt clear of the heater element when the drive for the belt is stopped, as will be explained in more detail later in the specification.

Each of the pads 212 is provided with a pair of cam followers 256 for engaging a presser cam 258 in the area immediately above the heater element 250. The cam 258 gently cams the pads 212 into engagement with the top sheet 22 of the wrapping material so that the top sheet is pressed tightly against the bottom sheet 11 in the area surrounding the formed sucker while the belt travels over the heating element 250. This causes a heat seal between the two sheets 11 and 22 of the heat sealable wrapping material.

In order to drive the heat sealing means 28 in timed sequence with the forming and wrapping means 20, a gear 260 is provided on the shaft 98. Also, a gear 262 keyed to the shaft 98 is provided with an endless chain 264 passing about a gear (not shown) similarly keyed to the shaft 96 (FIGURE 1). Shaft 228 is provided with an extension 229 having a gear 266 keyed thereto whereas the shaft 236 (FIGURE 8) is provided with a gear 270. An endless chain 272 passing about the gears 260, 266, 270 and an idler gear 272 causes the upper endless conveyor belt 220 and its pads 212 as well as the lower endless conveyor belt 232 to travel in the proper direction at a proper lineal speed for receiving the string of formed suckers from the forming and wrapping means 20.

After the heat sealing is accomplished, the string of suckers is discharged from between the belt 232 and the pads 212 and the sucker sticks are then gripped between two rubber covered timing belts 274 and 276. The upper timing belt 274 passes about a pulley 278 carried on a shaft 280 and a pulley 282 carried on the shaft 228. Likewise, the lower timing belt passes about pulleys 284 on a shaft 286 and a pulley (not shown) keyed to the shaft 236.

Timing belts 274 and 276 are adapted to carry the string of suckers through rotating cut-off knives 288 and 290, the cut-off knives 288 and 290 being driven in any suitable manner off of the shaft 228. The cut-off knives will sever the wrapping material intermediate successive formed suckers and the suckers are then released by the timing belts and drop onto a suitable take-off chute or conveyor 34 for transfer to suitable packaging apparatus.

The heater element 250 is pivotally mounted to a portion of the frame structure 36 on a longitudinal axis of the apparatus. In more detail, and referring specifically to FIGURE 9, the heater element 250 is pivoted to the frame structure 36 at 292 and a solenoid 294, also carried by the frame structure 36, is provided with a plunger arm 296 connected to a linkage mechanism 298 for supporting the heater element 250 in contact with the belt 232. When the solenoid 294 is deenergized, the solenoid plunger 296 is retracted causing the pivoting of the heater element 250 downwardly about its pivot 292 away from belt 232. The rods 252 and 254 support the belt in the area immediately above the heater element 250 when the heater element is pivoted away from the same and thereby does not permit the belt to become unduly heated.

Solenoid 294 is connected in series with the motor 42 so that when the motor 42 is actuating the various units of the apparatus, the solenoid 294 is energized and the heater element is held in position beneath the belt 232 so as to heat the same and cause sealing of the wrapping material. Since it has been found not desirable to cut off the heater element 250 when the machine stops for short periods, as it takes too much time to reheat the same when the machine is started, the heater element 250 is continuously operated and is on a different circuit than the circuit of the motor 42 and the solenoid 294.

The improved method and apparatus for accomplishing the present invention is susceptible to some modifications and changes without departing from the spirit and principles of the invention involved. The specific embodiment of apparatus and the method described illustrates a concept of the invention which has fully and effectively accomplished the objects and advantages of the invention. Therefore, the terminology used in the specification is for the purpose of description and not limitation, the scope of the invention being defined in the claims.

What is claimed is:

1. A method of producing a wrapped candy sucker comprising the steps of: depositing an unformed piece of candy while in a warm plastic condition onto a strip of wrapping material; laying a second strip of wrapping material over the unformed piece of candy; molding the piece of candy into a desired sucker shape while between the strips of wrapping material and while the strips of wrapping material are simultaneously and substantially formed to the shape of the molded piece of candy; inserting a sucker stick into the piece of candy as it is being molded into the desired sucker shape; and then sealing the two strips of wrapping material together about the formed sucker.

2. A method of producing a wrapped candy sucker comprising the steps of: depositing an unformed piece of candy while in a warm plastic condition onto a strip of wrapping material; positioning the end portion of a sucker stick on the strip of wrapping material adjacent the piece of candy; laying a second strip of wrapping material over the unformed piece of candy and the end portion of the previously-positioned sucker stick; molding the piece of candy into a desired sucker shape while between the strips of wrapping material and while the strips of wrapping material are simultaneously and substantially formed to the shape of the molded piece of candy; advancing the sucker stick transversely of and between the strips of wrapping material into the piece of candy as the sucker shape is being formed; and then sealing the two strips of wrapping material together to encase the formed sucker and a portion of the sucker stick.

3. A method of producing a wrapped candy sucker comprising the steps of: depositing an unformed piece of candy while in a warm plastic condition onto a strip of heat sealable wrapping material; positioning an end portion of a sucker stick on the strip of wrapping material adjacent the piece of candy; laying a second strip of wrapping material over the unformed piece of candy and the end portion of the previously-positioned sucker stick; forming the piece of candy into a desired sucker shape while sandwiched between the strips of wrapping material; advancing the sucker stick transversely of and between the strips of wrapping material and impaling the piece of candy as the sucker shape is being formed; and then subjecting the strips of wrapping material to heat at a temperature sufficient to fuse the same together while pressing at least the edge portions of the strips of wrapping material together whereby the pieces of wrapping material seal and encase the formed sucker and a portion of the sucker stick.

4. A method of continuously producing wrapped candy suckers from unformed pieces of candy in a plastic condition comprising the steps of: successively positioning pieces of unformed candy in spaced relationship to each other between two sheets of wrapping material moving in the same direction and in juxtaposition to each other; successively molding the unformed candy pieces into sucker pieces while moving with and between the strips of wrapping material and while the strips of wrapping material are simultaneously and substantially formed to the shape of the molded piece of candy; impaling the sucker sticks into each of the pieces of candy; and then sealing the sheets of material together so as to encompass the formed sucker.

5. A method of continuously producing wrapped candy suckers from unformed pieces of candy in a plastic condition comprising the steps of: successively positioning pieces of unformed candy in spaced relationship to each other between two sheets of heat sealable wrapping material moving in the same direction and in juxtaposition to each other; positioning an end portion of a sucker stick between the sheets of wrapping material and adjacent each of the pieces of candy; successively molding the unformed candy pieces into sucker shapes while moving with and carried between the strips of wrapping material and while the strips of wrapping material are simultaneously and substantially formed to the shape of the molded piece of candy; impaling the end portion of the pre-positioned sucker sticks into each of the pieces of candy as they are being molded; and then subjecting the strips of wrapping material to heat at a temperature sufficient to fuse the same together while pressing together the portions of the strips of wrapping material between formed suckers whereby the strips of wrapping material seal and encase the formed suckers and a portion of the sucker's stick.

6. The method defined in claim 5 including the further step of severing the sealed sheets of wrapping material intermediate the formed suckers.

7. A method of continuously producing wrapped candy suckers from unformed pieces of candy in a plastic condition comprising the steps of: moving a strip of wrapping material in a substantially horizontal plane; successively depositing the unformed pieces of candy in spaced-apart relationship on the moving strip of wrapping material; positioning an end portion of a sucker stick on the moving strip of wrapping material adjacent each piece of candy with the sucker stick having its longitudinal axis extending transversely of the strip of material; moving a second strip of wrapping material into juxtaposition with the first strip and with the unformed pieces of candy sandwiched therebetween, molding the unformed candy pieces into sucker shapes while moving with and between the strips of wrapping material and while the strips of wrapping material are simultaneously and substantially formed to the shape of the molded piece of candy; impaling the sucker sticks into each of the pieces of candy; and then forming a seal between the sheets of material so as to encompass the formed suckers and a portion of their stick.

8. The method defined in claim 7 including the further step of severing the sealed sheets of wrapping material intermediate the formed suckers.

9. In an apparatus for forming, wrapping and sealing candy suckers impaled upon a stick, the combination comprising: means for sandwiching unformed candy pieces between two sheets of wrapping material; molding means for advancing the two sheets of wrapping material in juxtaposition with the unformed pieces of candy therebetween and for forming the pieces into sucker shapes while being advanced; means cooperating with said molding means for impaling sucker sticks into the pieces of candy while being formed between the two sheets of wrapping material; and sealing means driven in timed sequence to said molding means for receiving the formed suckers sandwiched between the wrapping material, said sealing means cooperating with said molding means to advance the two sheets of wrapping material with the suckers therebetween and to simultaneously seal the two sheets together about the formed suckers and at least a portion of the sucker sticks.

10. An apparatus of the character described in claim 9 including means for positioning the end portions of sucker sticks between the two sheets of wrapping material adjacent to candy pieces thereon.

11. In an apparatus for forming, wrapping and sealing candy suckers impaled upon a stick, the combination comprising: means for sandwiching unformed candy pieces between two sheets of wrapping material; molding means for advancing the two sheets of wrapping material in juxtaposition with the unformed pieces of candy therebetween and for forming the pieces into sucker shapes while being advanced; and means cooperating with said molding means for impaling sucker sticks into the pieces of candy while being formed between the two sheets of wrapping material, said molding means including a pair of endless belt mechanisms having a plurality of dies thereon, said belt mechanisms having parallel runs wherein the dies of one belt cooperate with dies of the other belt to form the suckers and cam means for actuating said dies.

12. In an apparatus for forming, wrapping and sealing candy suckers impaled upon a stick the combination comprising: a sucker molding means including a pair of endless belt mechanisms having parallel runs and each carrying die members adapted to cooperate on the parallel runs; means for supplying first and second sheets of heat sealable wrapping material to said molding means; means for depositing unformed pieces of candy between said sheets in spaced relationship to each other prior to said sheets entering between dies of said molding means, means for positioning end portions of sucker sticks between said sheets in a position where they are adjacent to unformed candy pieces; means operative to impale the candy sticks into the pieces of candy while the candy is being molded in said molding means; and means receiving the formed suckers sandwiched between the sheets of wrapping material for sealing the sheets of wrapping material together about the formed suckers.

13. An apparatus of the character described in claim 12 wherein said last-mentioned means includes an endless belt having a run for supporting the formed suckers and sheets of wrapping material as they are discharged from said molding means; an endless belt mechanism having a plurality of dies thereon having cavities for receiving the formed sucker within the wrapping material, said endless belt mechanism having a run cooperating with the formed suckers and sheets of wrapping material support run of said first-mentioned endless belt, and a heating element positioned beneath the formed suckers and sheets of wrapping material support run of said endless belt.

14. An apparatus of the character described in claim 13 including means to mount said heating element for movement into and out of contact with said first-mentioned endless belt.

15. An apparatus of the character described in claim 13 including means for moving said heating element between operative and inoperative position and means for supporting the formed suckers and sheets of wrapping material support run of said endless belt away from said heating element when said heating element is in inoperative position.

16. In an apparatus for forming, wrapping and sealing candy suckers impaled upon a stick: means for sandwiching unformed candy pieces between two sheets of heat sealable wrapping material; endless belt-like conveying and molding means for advancing the two sheets of wrapping material in juxtaposition with the unformed pieces of candy therebetween and for forming the pieces of candy into sucker shapes while being advanced; endless belt-like heat sealing means cooperating with said molding means for receiving the formed suckers sandwiched between the two sheets of wrapping material to thereby seal the same, said heat sealing means also cooperating with said molding means for advancing the two sheets of wrapping material and pieces of candy through the apparatus, means for driving said molding means and said heat sealing means in timed synchronism; a heating element; and means to move said heating element between operative and inoperative position with respect to said endless belt-like heat sealing means, said last-mentioned means being operable to move said heating element to said inoperative position when said endless belt-like heat sealing means is inoperative.

17. A heat sealing mechanism for sealing sheets of wrapping material together having candy suckers sandwiched therebetween comprising: an endless belt having an upper run movable in a substantially horizontal plane; an endless belt-like mechanism having at least a lower run parallel to the horizontal upper run of said endless belt; said endless belt-like mechanism including a plurality of pads mounted thereon; each pad having a cavity for receiving the sucker and a portion of its stick; means for moving said endless belt and said endless belt-like mechanism in timed sequence; and a heating element movably mounted beneath the upper run of said endless belt for heating the same as it passes thereover; means for moving said heating element away from the upper run of said endless belt when said endless belt and said endless belt-like mechanism are inoperative.

18. A heating sealing element of the character described in claim 17 wherein said endless belt is made of a tetrafluoroethylene resin impregnated glass cloth.

19. A heat sealing apparatus of the character described in claim 17 wherein said pads of said endless belt mechanism are made of soft rubber.

20. A heat sealing apparatus of the character described in claim 17 including cam means to urge said pads toward said endless belt.

21. A heat sealing apparatus of the character described in claim 17 wherein said heating element is pivotally mounted on an axis parallel to the longitudinal axis of the upper run of said endless belt and wherein said means for moving said heating element includes a linkage mechanism connected to the same and a solenoid for operating said linkage mechanism.

22. A heat sealing apparatus of the character described in claim 17 including means for positively holding the horizontal run of said endless belt off said heating element when said heating element is moved away from the same, said last-mentioned means including at least a pair of rods extending beneath the upper run of said endless belt forwardly and rearwardly of said heating element.

References Cited in the file of this patent

UNITED STATES PATENTS

| | | |
|---|---|---|
| 2,660,963 | Covert et al. | Dec. 1, 1953 |
| 2,705,857 | Fox et al. | Apr. 12, 1955 |